(No Model.)
M. L. MANLEY.
POTATO PLANTER.
No. 574,037. Patented Dec. 29, 1896.
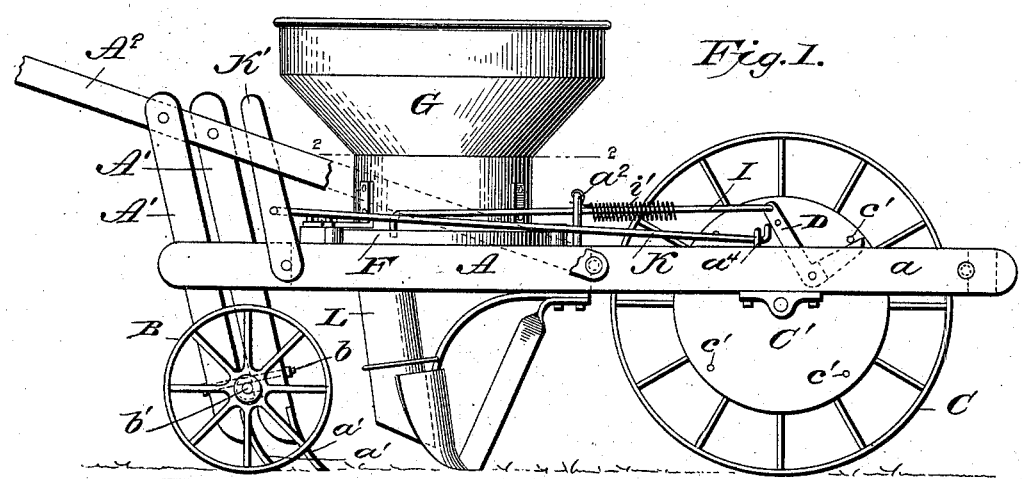
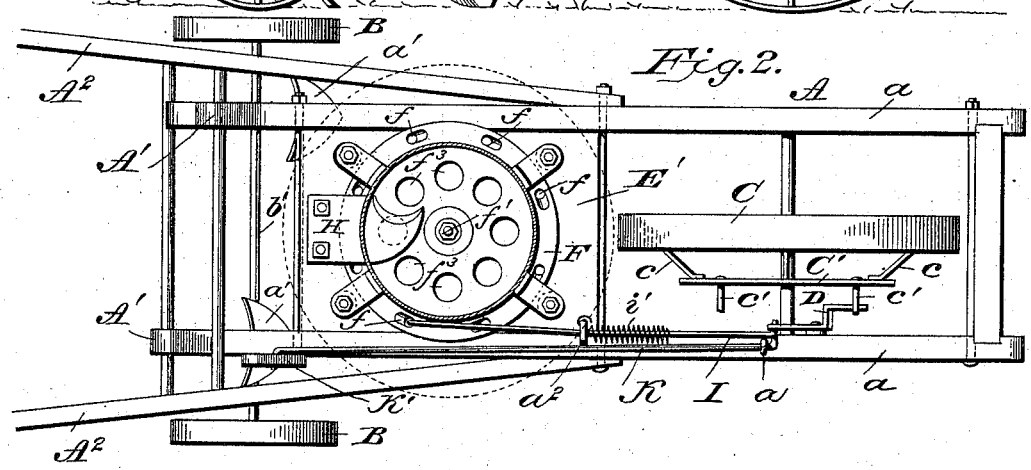
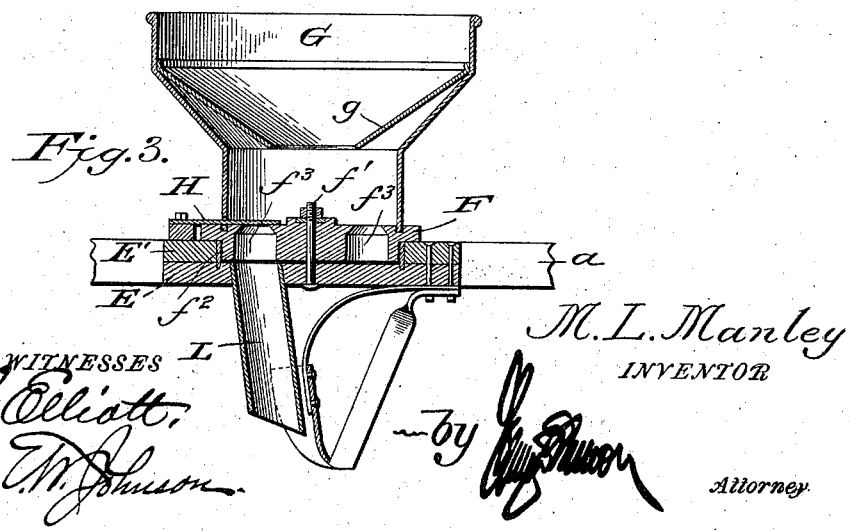
WITNESSES
M. L. Manley
INVENTOR
by
Attorney

UNITED STATES PATENT OFFICE.

MANDELBERT LIMON MANLEY, OF FERRY, MICHIGAN.

POTATO-PLANTER.

SPECIFICATION forming part of Letters Patent No. 574,037, dated December 29, 1896.

Application filed June 4, 1896. Serial No. 594,283. (No model.)

*To all whom it may concern:*

Be it known that I, MANDELBERT LIMON MANLEY, a citizen of the United States of America, residing at Ferry, in the county of Oceana and State of Michigan, have invented certain new and useful Improvements in Potato-Planters; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of my invention is to provide a planter of such construction that it can be used for planting potatoes and small seeds, as may be required; and it consists in the particular construction and combination of the parts, as will be hereinafter fully set forth, and particularly pointed out in the claims.

In the accompanying drawings, forming part of this specification, Figure 1 is a side elevation of a planter constructed in accordance with my invention. Fig. 2 is a plan view, a part of the hopper being shown in section; and Fig. 3 is a vertical sectional view.

A designates the frame, consisting of side and transverse bars connected to each other in any suitable manner, the longitudinal side pieces $a\ a$ of the frame being provided at their rear ends with standards $A'$, preferably arranged out of line with each other transversely of the frame, said standards carrying covering-shovels $a'$ at their lower ends.

Above the shovels $a'$ the standards may each be provided with a vertical series of apertures to receive eyebolts $b$, in which is journaled a transverse shaft $b'$, carrying the rear supporting-wheels B B of the machine, and by providing a series of vertical apertures the supporting-wheels B can be adjusted with respect to the standards to permit the shovels to enter the ground more or less. The handles $A^2$ of the machine are attached to the upper ends of the standards $A'$ and to the side pieces $a$ in the usual manner.

C designates the main supporting-wheel of the machine, which is mounted on an axle journaled at its ends in bearings attached to the under side of the longitudinal beams $a$, and the spokes of this supporting-wheel have outwardly-projecting arms $c$ secured thereto, a disk $C'$ being attached to the outer ends of said arms and provided with an axial opening through which the shaft of the supporting-wheel passes. The outer face of the disk $C'$ is provided with projecting pins $c'$, adapted to operate the rotary feeding-disk hereinafter described.

To the inner side of one of the longitudinal beams $a$ is pivoted a bell-crank lever D, one member of which normally lies in the path of the projecting pins $c'$ of the disk $C'$, and the other member of said bell-crank lever is connected to a sliding rod I, guided in a loop $a^2$, carried by the frame of the machine. The rod I is encircled by a helical spring $i'$, which is connected thereto and bears against the loop $a^2$ to return said rod to its normal position after being acted upon by the projecting pins $c'$. The rear end of the rod I is bent downward to engage with recesses $f$ near the outer edge of a rotary feeding-disk F, said recesses presenting inclined surfaces and vertical shoulders against which the end of the rod contacts.

The feeding-disk F is mounted on a transverse board E, secured between the longitudinal beams A, and is connected to said board by a vertical pivot pin or bolt $f'$. An annular strip $f^2$ is let into the board E and bears against the lower edge of the feeding-disk and against a board $E'$, secured above the board E, the feeding-disk having a projecting flange at its upper part which bears upon the said board $E'$. The feeding-disk F is provided with a concentric series of pockets $f^3$, the upper ends of which are contracted, as shown in Fig. 3, and the upper surface of said feeding-disk has a circular groove in which fits the lower end of a hopper G. This hopper is provided with a plate $g$, which gives a greater inclination to the feed portion of the hopper and provides an enlarged space below the opening in the feed-plate, which will prevent choking of that part of the hopper above the feed-wheel, and this hopper is attached to the frame of the planter by angle-plates.

The frame of the machine also carries a knife or cutter H, which projects through the lower part of the hopper and lies in the path of the pockets, said knife having a curved cutting edge, as shown in Fig. 2.

K designates a rod the forward end of which is passed through an eye or loop $a^4$ and is bent so as to engage with the upwardly-projecting member of the bell-crank lever D, the rear end of said rod being connected to an operating-lever K', pivoted to one of the longitudinal beams of the main frame. The object of this rod is to throw the bell-crank lever so that the lower member thereof will be out of the path of the projecting pins $c'$ and thereby stop the operation of the feeding-disk.

Beneath the feed-wheel is secured the usual discharge-spout L, in front of which is attached a shovel and colter.

In operation, when the parts are assembled as shown in the drawings the potatoes are placed in the hopper and partially enter the pockets in the feed-wheel, and as the implement is drawn across the field a furrow is opened and the feed-wheel turned, the knife cutting the potato and allowing the severed portion to fall in rear of the central shovel in the furrow opened thereby, the rear shovels $a'$ $a'$ covering the potato that has been deposited. Should it be desired to throw the operating mechanism out of gear, it is done by throwing the end of the lever K' at the rear of the planter forward to its fullest extent.

Having thus described my invention, what I claim as new, and desire to secure by Letters Patent, is—

1. In a planter, the combination, of a suitably-supported hopper, a rotary feed-wheel made of a single piece and having a series of pockets the upper ends of which are contracted, a knife positioned to lie over the upper face of the feed-wheel so that the pockets will pass beneath the same, the feed-wheel having a flange which projects beyond the hopper; recesses in said flange which are inclined on one side and vertical on the other, with which recesses the bent end of a rod engages, and means for operating said rod, said means including a spring-lever, tappets on the front supporting-wheel, and a lever which contacts with the tappets to move the lever against the action of its spring, substantially as shown and for the purpose set forth.

2. In a seed-planter, the combination, of a frame constructed substantially as shown and provided with supporting-wheels, one of the supporting-wheels carrying a disk with projecting pins for engagement with a bell-crank lever, a rod having its rear end bent downwardly, said rod being spring-actuated in one direction and moved in the other direction by the bell-crank lever, and pins on the hereinbefore-mentioned disk, a rotary feed-wheel having pockets located within the hopper and a series of apertures or openings $f$ having an inclined surface and vertical shoulder with which the bent end of the spring-actuated rod engages, substantially as shown and for the purpose set forth.

3. In a seed-planter, the combination, of the rotary disk constructed substantially as shown and provided with a flange which projects beyond the hopper, said flange having recesses with one of the sides thereof inclined, a rod having a bent end for engagement with said recesses, the forward end of said rod being connected to a bell-crank lever, a coiled spring mounted on the rod and attached to the same and to a fixed guide, and a disk with projecting pins coacting to actuate the rod, the rod K connected to a hand-lever, the forward end of said rod being bent to lie in the path of the upper member of the bell-crank lever, substantially as shown and for the purpose set forth.

4. In a planter, the combination, of a front or driving wheel C carrying a disk with projecting pins $c'$, a bell-crank lever pivoted to the frame of the planter one member of the lever being bent to lie in the path of the projecting pins, the other member being secured to a rearwardly-extending rod which passes through a suitable guide, a coiled spring carried by the rod and bearing against the guide to effect a movement of the rod in a contrary direction from which it is moved by the bell-crank lever; a rotary feed-wheel above which is mounted a hopper, said feed-wheel having pockets within the hopper and beyond the same a flange with recesses $f$ with which the bent ends of the hereinbefore-mentioned rod engages, together with a rod K having bent ends the forward end lying in the path of one of the members of the bell-crank lever the other end engaging with a hand-lever K', the forward movement of said hand-lever being adapted to throw the bell-crank lever in the same direction it is actuated by the wheel C, substantially as shown.

In testimony whereof I affix my signature in presence of two witnesses.

MANDELBERT LIMON MANLEY.

Witnesses:
C. M. GUNN,
WM. E. GUNN.